Oct. 25, 1932.  I. C. MARTIN  1,884,043
DRIVE FOR THE SPEED GOVERNOR OF A PRIME MOVER
Filed May 22, 1930
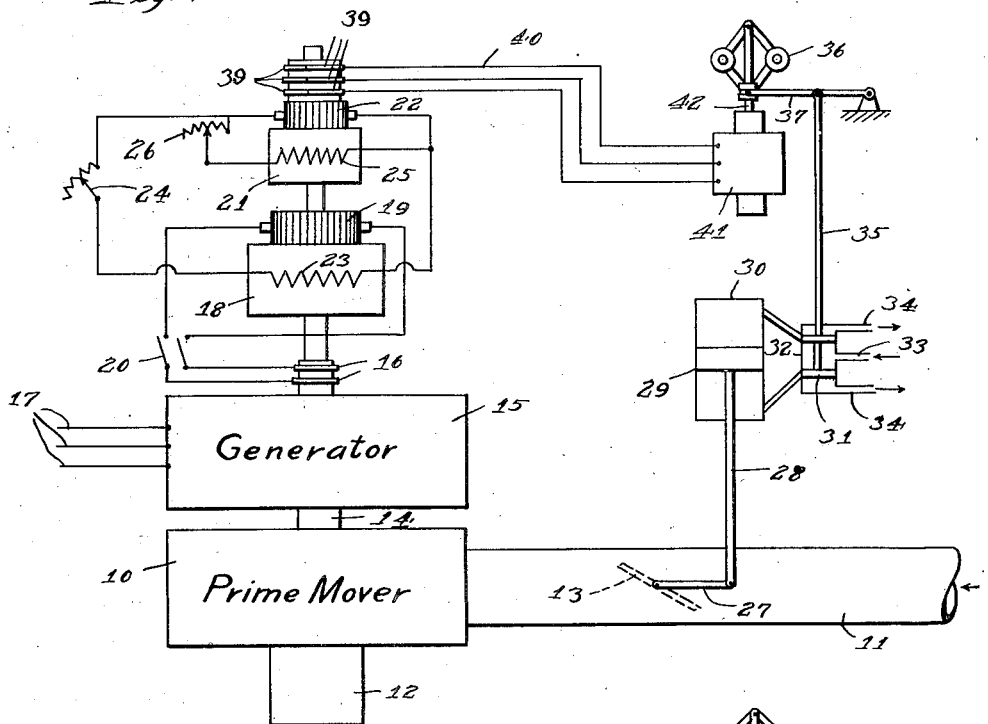
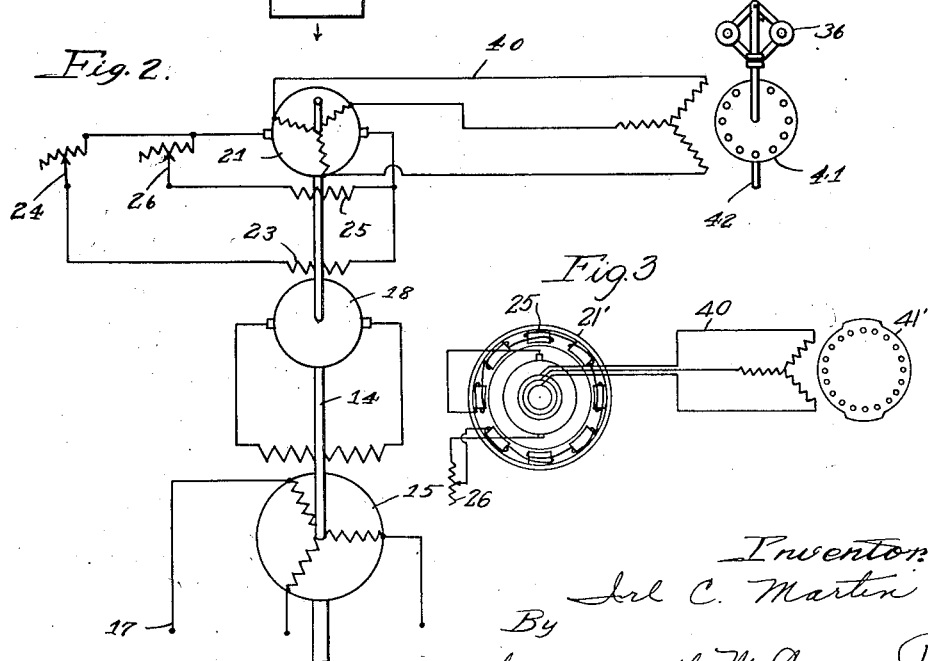

Patented Oct. 25, 1932

1,884,043

UNITED STATES PATENT OFFICE

IRL C. MARTIN, OF ROCKFORD, ILLINOIS, ASSIGNOR TO WOODWARD GOVERNOR COMPANY, OF ROCKFORD, ILLINOIS, A CORPORATION OF ILLINOIS

DRIVE FOR THE SPEED GOVERNOR OF A PRIME MOVER

Application filed May 22, 1930. Serial No. 454,538.

This invention relates to a new and improved drive for the speed governor of a prime mover in a hydro-electric or other power station.

It is well recognized that the most important requirements of a speed governor are accuracy and promptness, aside, of course, from the matter of absolute reliability. In the past, it has been the practice to drive the governor either with a belt and pulleys from the shaft of the prime mover or by means of gearing and shafting. The objection to belts is that the movement imparted by the governor is not absolutely proportional to the speed of the prime mover for several reasons and belts are bound to give more or less trouble and inconvenience. The objection to gearing is that the operation is noisy and the movement transmitted is not perfectly uniform. These objections have led to a change to the present practice of driving the governor by means of an alternating current motor connected to the generator leads. This gives a fair degree of satisfaction but transformers are required to reduce the voltage between the generator and the motor driving the governor and in case of heavy line disturbances the generator voltage may become too low to drive the governor motor at a certain requisite speed. It is, therefore, the principal object of this invention to provide a governor drive that is free from the above objections.

The drive provided in accordance with my invention is adapted to those installations where the generator is mounted on the shaft of the prime mover and has on the same shaft an exciter for the generator field and a sub-exciter for the field of the main exciter. The invention consists in equipping the sub-exciter with slip-rings connected to certain sections of the commutator so as to provide a source of alternating current of a frequency corresponding to the speed of the prime mover, and utilizing the alternating current thus obtained for a motor arranged to drive the centrifugal element of the speed governor for the prime mover. This manner of drive insures that the speed of the governor will be exactly proportional to the speed of the prime mover and since the sub-exciter is free from outside disturbances the voltage supplied to the governor motor is not affected by line troubles. Needless to state the current obtained is of suitable voltage without the use of transformers.

The invention is illustrated in the accompanying drawing, in which—

Figure 1 is a more or less diagrammatic view showing the application of my invention to a hydro-electric power plant installation, Fig. 2 is an electrical wiring diagram, and Fig. 3 is another diagram corresponding to a portion of Fig. 2, but illustrating a modification.

Referring to Fig. 1, there is shown diagrammatically enough of a hydro-electric power plant installation to properly illustrate my improved speed governor drive. It should be understood at the outset that the invention is applicable to any type of hydro-electric or other plant. The term " prime mover " is, therefore, to be taken in its broadest sense and the claims should be construed accordingly.

The prime mover, indicated by the reference numeral 10, is a turbine having a penstock 11 and draft tube 12 for the inlet and outlet of water. 13 is a pivot valve or gate controlling the inlet of water which, as will presently appear, is regulated according to the load to maintain a substantially constant speed for the prime mover. The shaft 14 of the prime mover has the rotor of the generator 15 mounted directly thereon. Brushes 16 cooperate with collector rings to handle the field current for the rotor or revolving field coils of the generator. At 17 are indicated the line conductors, of a 3-phase system, connected with the generator. An exciter 18 has its armature also mounted on the shaft 14, this being a direct current generator for exciting the generator 15 and having brushes cooperating with its commutator 19 connected with the brushes 16, previously mentioned, through the usual field switch 20. A sub-exciter 21, which is also a D. C. generator, but which, as will presently appear, serves also as a source of alternating current, has its armature also mounted on the shaft 14, and brushes cooperating with the commutator 22 of the direct current part of the sub-exciter are connected with the field 23 of the main exciter, a rheostat 24 being connected in series with the field. The field 25 of the sub-exciter has a shunt across the commutator, and a rheostat 26 is connected in series with the field. In the operation of such a power plant the fluctuations in the load which are ordinarily of relatively small percentage excepting in cases of line troubles, and so forth, the field 23 is subject to variation usually by an automatic voltage regulator in order to properly excite the generator to meet the changes in demand. It is also obvious that these load changes make it necessary to adjust the valve or gate 13 in order to maintain a substantially constant speed for the prime mover.

Various forms of means may be provided for operating the valve or gate 13. It is, however, preferred to utilize a fluid pressure type means where the governor is arranged simply to control a pilot valve and this in turn controls the operation of the hydraulic piston which operates the gate or valve. In Fig. 1 the gate or valve 13 is illustrated as having a lever 27 for operating the same connected through a rod 28 with a piston 29 in a hydraulic cylinder 30. A pilot valve 31 operating in a valve chamber 32 controls the admission of the pressure fluid to either end of the cylinder 30 and the exhausting of the fluid from the other end in a well known manner, the pipe shown at 33 having connection with an oil pump and associated pressure and storage tanks for the delivery of the pressure fluid and the pipes 34 being return pipes for the exhausting of the fluid from either end of the cylinder. A rod 35 is shown for operating the pilot valve suitably connected with a fly ball governor 36 through the intermediary of a rocker beam 37. Leaving out of consideration for the time being the means for driving the governor 36, it will be evident that if the governor speeds up, the pilot valve 31 is raised to admit pressure fluid to the upper end of the cylinder 30 so as to cut down the flow of water through the penstock 11, and vice versa. Such indirect control of the speed of a prime mover by a governor is well known in this art and no invention is claimed in the details of the mechanism just described excepting only in so far as the same cooperate in the general combination.

It is imperative that the speed of the governor be exactly proportional to the speed of the prime mover. The governor drive provided in accordance with my invention positively insures such a speed relationship. The sub-exciter 21 has provided in connection with the commutator 22 three slip-rings 38 connected to certain sections of the commutator to provide a source of alternating current of a frequency corresponding to the speed of the prime mover. Brushes 39 cooperating with the slip-rings 38 have wires 40 connecting the same with a squirrel cage induction motor 41 or any suitable synchronous motor that will operate at a speed which is a linear function of the frequency at the source of current 21. The motor 41 has the fly ball governor 36 mounted on the armature shaft 42 thereof. The motor 41, in order to be certain of driving the governor 36 above a certain speed, is simply equipped with the proper number of poles in a definite proportion to the number of poles in the sub-exciter. For example, if the motor 41 is to turn at four times the speed of the sub-exciter 21 the motor 41 will be provided with, say, two poles, as compared with eight poles for the sub-exciter. Thus, in Fig. 3, the motor 41' has two poles and the sub-exciter 21' eight poles to secure the 4:1 speed relationship. It will be observed also that the motor 41' is a synchronous motor instead of a squirrel cage induction motor. The motor 41, or 41', in other words, always operates at a speed proportionate with the generator 15 and sub-exciter 21 and maintains the speed of the governor exactly proportional to the speed of the prime mover.

In operation, the motor 41 by reason of the fact that it always operates at a speed proportionate to that of the sub-exciter 21 and the speed of the latter varies with the speed of the prime mover, will cause the governor 36 to speed up in proportion to the speeding up of the prime mover or to slow down in proportion to the slowing down thereof. The governor, through its indirect control of the gate or valve 13, serves to maintain the speed of the prime mover substantially constant. The fact that the motor 41 relies upon the sub-exciter 21 instead of the generator 15 itself is of advantage in several ways: the current obtained is of suitable voltage without the use of transformers, and there is substantially no fluctuation in voltage due to line troubles, the sub-exciter being free from outside disturbances.

I claim:

1. The combination with a prime mover and a generator driven thereby, of an exciter for the generator comprising an armature driven in timed relation with the prime mover, a commutator on the armature, and brushes cooperating with the commutator serving as a source of direct current for excitation of the generator, slip-rings also provided on the armature connected with certain sections of the commutator, and brushes co-operating with said rings to provide a source of alternating current of a frequency corresponding to the speed of the prime mover, a centrifugal type speed governor for controlling the operation of the prime mover, and a motor having connection with the last mentioned brushes and serving to drive the governor.

2. The combination with a prime mover, a generator driven thereby, and an exciter for the generator, of a subexciter comprising an armature driven in timed relation with the prime mover, a commutator on the armature, and brushes cooperating with the commutator serving as a source of direct current for excitation of the exciter as well as the subexciter, slip-rings also provided on the armature connected with certain sections of the commutator, and brushes cooperating with said rings to provide a source of alternating current of a frequency corresponding to the speed of the prime mover, a centrifugal type speed governor for controlling the operation of the prime mover, and a motor having connection with the last mentioned brushes and serving to drive the governor.

3. The combination with a prime mover and a generator driven thereby, of an exciter for the generator comprising an armature driven in timed relation with the prime mover, a commutator on the armature, and brushes cooperating with the commutator serving as a source of direct current for excitation of the generator, slip-rings also provided on the armature connected with certain sections of the commutator, and brushes cooperating with said rings to provide a source of alternating current of a frequency corresponding to the speed of the prime mover, a centrifugal type speed governor for controlling the operation of the prime mover, and a motor having connection with the last mentioned brushes and serving to drive the governor, said motor being of a type that will operate at a speed which is a linear function of the frequency.

4. The combination with a prime mover and a generator driven thereby, of an exciter for the generator comprising an armature driven in timed relation with the prime mover, a commutator on the armature, and brushes cooperating with the commutator serving as a source of direct current for excitation of the generator, slip-rings also provided on the armature connected with certain sections of the commutator, and brushes cooperating with said rings to provide a source of alternating current of a frequency corresponding to the speed of the prime mover, a centrifugal type speed governor for controlling the operation of the prime mover, and a motor having connection with the last mentioned brushes and serving to drive the governor, said motor being of a type that will operate at a speed which is a linear function of the frequency, said motor having a certain number of poles in comparison with a larger number of poles for the exciter, whereby to cause the motor to operate at a proportionately higher speed and thus operate the governor at a certain requisite speed.

5. The combination with a prime mover, a generator driven thereby, and an exciter for the generator, of a sub-exciter comprising an armature driven in timed relation with the prime mover, a commutator on the armature, and brushes cooperating with the commutator serving as a source of direct current for excitation of the exciter as well as the sub-exciter, slip-rings also provided on the armature connected with certain sections of the commutator, and brushes cooperating with said rings to provide a source of alternating current of a frequency corresponding to the speed of the prime mover, a centrifugal type speed governor for controlling the operation of the prime mover, and a motor having connection with the last mentioned brushes and serving to drive the governor, said motor being of a type that will operate at a speed which is a linear function of the frequency.

6. The combination with a prime mover, a generator driven thereby, and an exciter for the generator, of a sub-exciter comprising an armature driven in timed relation with the prime mover, a commutator on the armature, and brushes cooperating with the commutator serving as a source of direct current for excitation of the exciter as well as the sub-exciter, slip-rings also provided on the armature connected with certain sections of the commutator, and brushes cooperating with said rings to provide a source of alternating current of a frequency corresponding to the speed of the prime mover, a centrifugal type speed governor for controlling the operation of the prime mover, and a motor having connection with the last mentioned brushes and serving to drive the governor, said motor being of a type that will operate at a speed which is a linear function of the frequency, said motor having a certain number of poles in comparison with a larger number of poles for the exciter whereby to cause the motor to operate at a proportionately higher speed and thus operate the governor at a certain requisite speed.

7. The combination with a prime mover, a generator driven thereby, and an exciter for the generator, of a sub-exciter comprising an armature driven in timed relation with the prime mover, a commutator on the armature, and brushes cooperating with the commutator serving as a source of direct current for excitation of the exciter as well as the sub-exciter, slip-rings also provided on the armature connected with certain sections of the commutator, and brushes cooperating with said rings to provide a source of alternating current of a frequency corresponding to the speed of the prime mover, a centrifugal type speed governor for controlling the operation of the prime mover, and a squirrel cage induction motor having connection with the last mentioned brushes and serving to drive the governor.

8. The combination with a prime mover and a generator driven thereby, of an exciter for the generator comprising an armature driven in timed relation with the prime mover, a commutator on the armature, and brushes cooperating with the commutator serving as a source of direct current for excitation of the generator, slip-rings also provided on the armature connected with certain sections of the commutator, and brushes cooperating with said rings to provide a source of alternating current of a frequency corresponding to the speed of the prime mover, a centrifugal type speed governor for controlling the operation of the prime mover, and a squirrel cage induction motor having connection with the last mentioned brushes and serving to drive the governor.

9. The combination with a prime mover, the speed of which it is desired to maintain substantially constant, of a governor for the prime mover, the same being arranged in slowing down to cause the prime mover to speed up and vice versa, a D. C. generator comprising an armature mounted on a shaft driven directly by the prime mover, a commutator on the armature, and brushes cooperating with the commutator serving as a source of direct current, a field for said generator having shunt connection with said brushes, collector rings connected to certain sections of the commutator, and brushes cooperating therewith serving as a source of alternating current of a frequency proportional to the speed of the prime mover, and a motor for driving the governor having connection with the last mentioned brushes, said motor bing of a type that will operate at a speed which is a linear function of the frequency.

10. The combination with a prime mover and a generator driven thereby, of an exciter for the generator comprising an armature driven in timed relation with the prime mover, a commutator and armature windings on the armature, and brushes cooperating with the commutator serving as a source of direct current for excitation of the generator, slip-rings also provided on the armature connected with certain points of the armature windings, and brushes cooperating with said rings to provide a source of alternating current of a frequency bearing a predetermined relation to the speed of the prime mover, a centrifugal type speed governor for controlling the operation of the prime mover, and a motor operated by the alternating current and serving to drive the governor.

11. The combination with a prime mover, generator driven thereby, and an exciter for the generator, or a sub-exciter comprising an armature driven in timed relation with the prime mover, a commutator and armature windings on the armature, and brushes cooperating with the commutator serving as a source of direct current for excitation of the exciter, slip-rings also provided on the armature connected with certain points of the armature windings, and brushes cooperating with said rings to provide a source of alternating current of a frequency bearing a predetermined relation to the speed of the prime mover, a centrifugal type speed governor for controlling the operation of the prime mover, and a motor operated by said alternating current and serving to drive the governor.

12. The combination with a prime mover and a generator driven thereby, of an exciter for the generator comprising an armature driven in timed relation with the prime mover, means on said armature for A. C. and D. C. generation, the direct current serving to excite the generator, the alternating current being of a frequency bearing a predetermined relation to the speed of the prime mover, a centrifugal type speed governor for controlling the operation of the prime mover, and a motor operated by the alternating current and serving to drive the governor.

13. The combination with a prime mover, a generator driven thereby, and an exciter for the generator, of a sub-exciter comprising an armature driven in timed relation with the prime mover, means on said armature for A. C. and D. C. generation, the direct current serving to excite the exciter, the alternating current being of a frequency bearing a predetermined relation to the speed of the prime mover, a centrifugal type speed governor for controlling the operation of the prime mover, and a motor operated by the alternating current and serving to drive the governor.

In witness of the foregoing I affix my signature.

IRL C. MARTIN.